United States Patent
Anders et al.

(10) Patent No.: US 11,140,222 B2
(45) Date of Patent: Oct. 5, 2021

(54) AGGREGATING ELECTRONIC DEVICES TO PROVIDE A SYNCHRONIZED PRESENTATION

(71) Applicant: International Business Machines Corporation, Armonk, NY (US)

(72) Inventors: Kelley Anders, East New Market, MD (US); Jonathan Dunne, Dublin (IE); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 15/820,607

(22) Filed: Nov. 22, 2017

(65) Prior Publication Data

US 2019/0158586 A1    May 23, 2019

(51) Int. Cl.
*H04L 29/08* (2006.01)
*H04L 29/06* (2006.01)
*G06F 3/0483* (2013.01)

(52) U.S. Cl.
CPC ...... *H04L 67/1095* (2013.01); *H04L 65/1069* (2013.01); *H04L 65/1073* (2013.01); *H04L 65/403* (2013.01); *H04L 65/602* (2013.01); *H04L 67/146* (2013.01); *G06F 3/0483* (2013.01)

(58) Field of Classification Search
CPC ............ H04L 67/1095; H04L 65/1069; H04L 65/1073; H04L 65/403; H04L 65/602; H04L 67/146; H04L 12/18; H04L 67/06; G06F 3/0483
See application file for complete search history.

(56) References Cited

U.S. PATENT DOCUMENTS

| 7,434,153 B2 | 10/2008 | Liu et al. | |
| 7,739,584 B2 * | 6/2010 | Vella | H04N 5/445 715/200 |
| 8,688,851 B2 | 4/2014 | Shin et al. | |

(Continued)

FOREIGN PATENT DOCUMENTS

| EP | 2 723 041 A1 | 4/2014 | |
| WO | WO-2014197121 A2 * | 12/2014 | ............. H04L 12/18 |
| WO | 2015/081647 A1 | 6/2015 | |

OTHER PUBLICATIONS

Maria Husmann et al., "Orchestrating Multi-Device Presentations with OmniPresent", Proceedings of the 6th ACM International Symposium on Pervasive Displays, ACM 2017, 8 pages.

(Continued)

*Primary Examiner* — Benjamin M Thieu
(74) *Attorney, Agent, or Firm* — Michael P. O'Keefe; Hunter E. Webb; Keohane & D'Alessandro, PLLC

(57) ABSTRACT

Approaches presented herein enable aggregating a set of defined electronic devices to provide a synchronized presentation experience across the devices. Electronic devices for primary and secondary presenters are registered. Identifiers for the devices are defined to link them together and understand which device plays which function related to a presentation session. A synchronization configuration is created in terms of primary and secondary presenter roles. A synchronized presentation stream is generated for display with aggregated synchronization enabled based on the synchronization configuration.

20 Claims, 5 Drawing Sheets

(56) References Cited

U.S. PATENT DOCUMENTS

| | | | |
|---|---|---|---|
| 9,026,915 B1* | 5/2015 | Ehlen | G06F 40/103 |
| | | | 715/728 |
| 9,069,579 B2 | 6/2015 | Ben-Shaul et al. | |
| 9,465,515 B2* | 10/2016 | Venticinque | G06F 3/04817 |
| 9,817,913 B2* | 11/2017 | Goel | G06F 17/30893 |
| | | | 715/234 |
| 10,257,140 B1* | 4/2019 | Zukerman | G06F 16/903 |
| | | | 709/206 |
| 2004/0113935 A1* | 6/2004 | O'Neal | G01N 30/56 |
| | | | 715/732 |
| 2005/0039130 A1* | 2/2005 | Paul | G06F 16/40 |
| | | | 715/730 |
| 2006/0075348 A1* | 4/2006 | Xu | G06F 3/0481 |
| | | | 715/730 |
| 2008/0168355 A1* | 7/2008 | Dunlap | G06Q 10/10 |
| | | | 715/733 |
| 2010/0228803 A1* | 9/2010 | Quinn | G06F 16/4387 |
| | | | 707/913 |
| 2012/0192055 A1* | 7/2012 | Antebi | G06F 16/1834 |
| | | | 715/229 |
| 2013/0117692 A1* | 5/2013 | Padmanabhan | H04N 21/4126 |
| | | | 715/753 |
| 2015/0156233 A1* | 6/2015 | Bergo | H04L 65/403 |
| | | | 715/753 |
| 2015/0222496 A1* | 8/2015 | Lewis | G06F 3/0486 |
| | | | 715/723 |
| 2015/0234800 A1* | 8/2015 | Ehlen | G06F 16/4393 |
| | | | 715/202 |
| 2016/0255125 A1 | 9/2016 | Lotfallah et al. | |
| 2016/0294894 A1* | 10/2016 | Miller | G06F 16/24578 |

OTHER PUBLICATIONS

Hangjin Zhang et al., "A Presentation Authoring Tool for Media Devices Distributed Environments", 2004 IEEE International Conference on Multimedia and Expo, ICME '04, vol. 3, 4 pages.

Rustam Asnawi et al., "Robust synchronization models for Presentation System using SMIL-driven approach", Computers & Education 60, (2013), Copyright 2012 Elsevier Ltd., pp. 273-287.

Qiong Liu, "Framework for effective use of multiple displays", Proc. of SPIE, 2005, 12 pages.

* cited by examiner

| NAME | MEDIUM | DEVICE ID | ROLE | APPLICATION |
|---|---|---|---|---|
| PETER | MACBOOK | 131 | SLIDE PRESENTATION (SLIDES 1-10) | POWERPOINT |
| PAUL | IOS | 3242 | ANALYTICS DEMONSTRATION | ACME STUDIO |
| EMILY | ANDROID | 31515 | ANALYTICS DASHBOARD | ACME BROWSER |
| MARY | WINDOWS | 734 | SLIDE PRESENTATION (SLIDES 11-20) | POWERPOINT |

FIG. 3

AGGREGATING ELECTRONIC DEVICES TO PROVIDE A SYNCHRONIZED PRESENTATION

TECHNICAL FIELD

The subject matter of this invention relates generally to multi-device coordination. More specifically, aspects of the present invention provide a dynamic solution for aggregating a set of defined electronic devices to provide a synchronized presentation experience across the devices.

BACKGROUND

The use of electronic devices such as smartphones, tablet computers, laptops, and personal computers has become more and more pervasive in society, and many users own multiple such devices. The varied functions that these devices can perform continue to expand. The expansion often includes the integration of personal computer technology into other electronic devices, such as smartphones and tablets. By utilizing computer technology, users can now have access to computing functions and resources in multiple devices. Various applications, such as presentation applications for communicating with others, have been developed and are being developed for use in these different device types.

Businesses and professional firms can use presentations to inform, educate, motivate and persuade internal and external audiences. Presentations can make it easier to engage an audience. Striking images can hold an audience's attention, while clear bullet points or summary text helps the audience follows the logic of a presentation. The theatrical nature of a presentation can create greater impact than an individual trying to make the same point by talking alone. Presentations are also a versatile communication tool. They can be used in one-to-one meetings, viewing the content on a laptop or tablet computer. The same presentation can feature as a core element in a large meeting, using a projector and/or screen. Presentations can also be made available online for downloading from the Internet or viewing during a Web conference.

SUMMARY

In general, embodiments of the present invention enable aggregating a set of defined electronic devices to provide a synchronized presentation experience across the devices. Electronic devices for primary and secondary presenters are registered. Identifiers for the devices are defined to link them together and understand which device plays which function related to a presentation session. A synchronization configuration is created in terms of primary and secondary presenter roles. A synchronized presentation stream is generated for display with aggregated synchronization enabled based on the synchronization configuration.

One aspect of the present invention includes a method for generating a synchronized presentation session, the method comprising: registering a primary presenting electronic device and a secondary presenting electronic device; defining a first identifier and a first content portion related to the primary presenting electronic device; defining a second identifier and a second content portion related to the secondary presenting electronic device; defining, using the first and second identifiers and the first and second content portions, a synchronization configuration to identify a flow for the presentation session; and automatically generating, by aggregating the primary and secondary presenting electronic devices based on the synchronization configuration, a synchronized presentation stream for display.

Another aspect of the present invention includes a computer program product embodied in a computer readable medium that, when executed by a computer device, performs a method for generating a synchronized presentation session, the method comprising: registering a primary presenting electronic device and a secondary presenting electronic device; defining a first identifier and a first content portion related to the primary presenting electronic device; defining a second identifier and a second content portion related to the secondary presenting electronic device; defining, using the first and second identifiers and the first and second content portions, a synchronization configuration to identify a flow for the presentation session; and automatically generating, by aggregating the primary and secondary presenting electronic devices based on the synchronization configuration, a synchronized presentation stream for display.

Yet another aspect of the present invention includes a system for generating a synchronized presentation session, comprising: a memory medium comprising instructions; a bus coupled to the memory medium; and a processor coupled to the bus that when executing the instructions causes the system to perform a method, comprising: registering a primary presenting electronic device and a secondary presenting electronic device; defining a first identifier and a first content portion related to the primary presenting electronic device; defining a second identifier and a second content portion related to the secondary presenting electronic device; defining, using the first and second identifiers and the first and second content portions, a synchronization configuration to identify a flow for the presentation session; and automatically generating, by aggregating the primary and secondary presenting electronic devices based on the synchronization configuration, a synchronized presentation stream for display.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 3 shows an example device medium identification table 300 according to an illustrative embodiment of the present invention;

Figure 1:
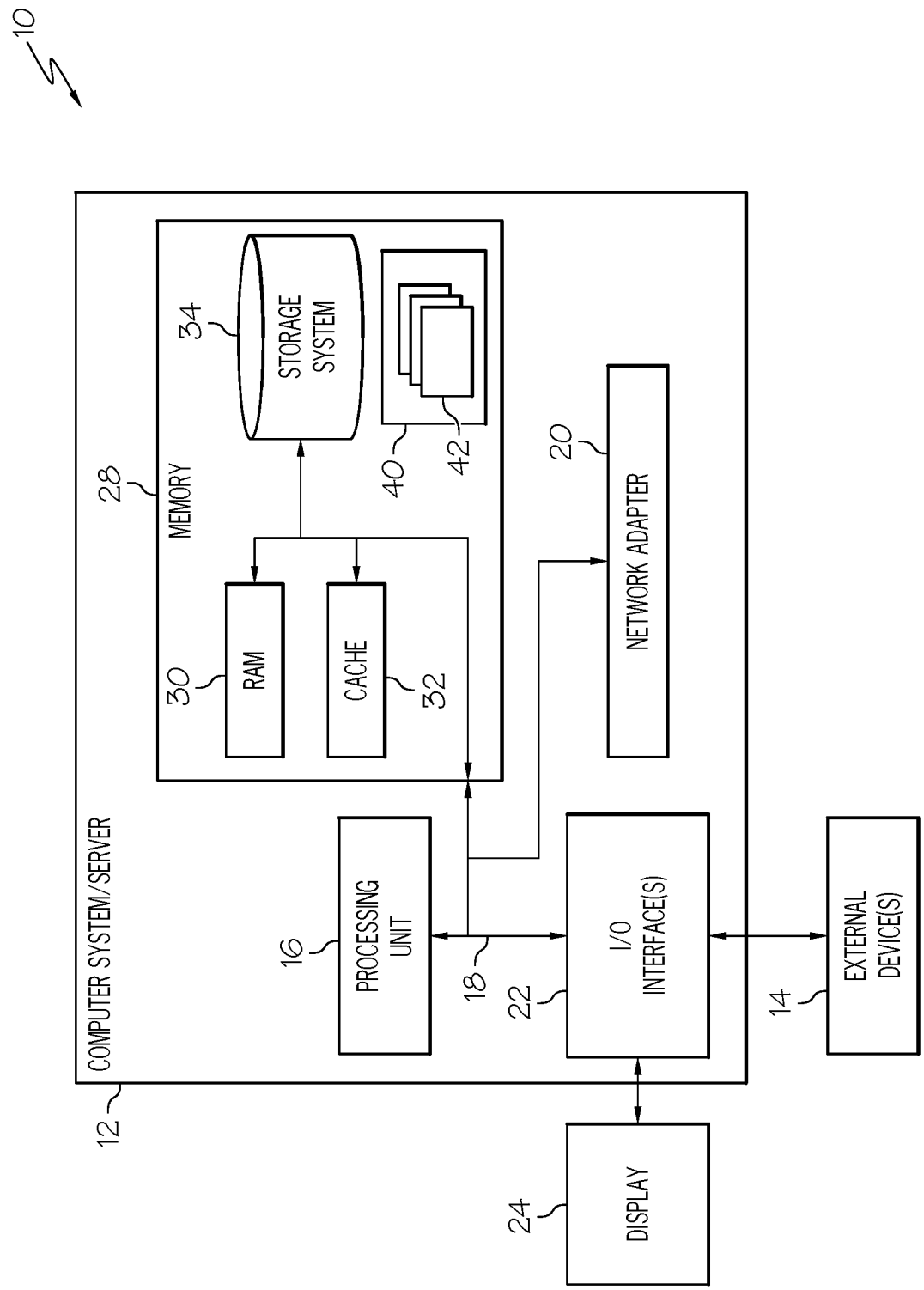
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this invention may be embodied in many different forms and should not be construed as limited to the illustrative embodiments set forth herein.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context. As used herein, the terms "user" and "consumer" are used interchangeably and refer to an individual who has opted in to receiving local inventory notifications.

As used herein, MacBook is a registered trademark of Apple, Inc., Cupertino, Calif. iOS is a registered trademark of Cisco in the U.S. and other countries and is used by Apple, Inc. of Cupertino, Calif. under license. PowerPoint and Windows are registered trademarks of Microsoft Corporation of Redmond, Wash.

As stated above, embodiments of the present invention enable aggregating a set of defined electronic devices to provide a synchronized presentation experience across the devices. Electronic devices for primary and secondary presenters are registered. Identifiers for the devices are defined to link them together and understand which device plays which function related to a presentation session. A synchronization configuration is created in terms of primary and secondary presenter roles. A synchronized presentation stream is generated for display with aggregated synchronization enabled based on the synchronization configuration.

The inventors have noted shortcomings in current presentation applications (e.g., PowerPoint) which are limited within the function of privately sharing data, messaging, and viewing notes while a speaker is conducting a presentation. Both physical and digital delivery methods can be strengthened to provide greater capabilities to the presenter. For example, in order to be able to look at speaker presentation notes, the presentation itself, and perhaps chat with co-presenters privately, a presenter would need to bring up the presentation application, upload the presentation in a particular format to a cloud meeting and bring up a private chat on his desktop. Another option would be for the presenter to try to chat within the cloud meeting and ensure it's a private conversation. Then, he or she would have to somehow switch between all three of those functions simultaneously. Furthermore, there are even more limiting constraints if the speaker is presenting in person.

The present invention is directed to a system that can coordinate and manage all multiple applications synchronously, whether they are co-located on the same machine or are on separate networked or mobile devices such that, an advance of a slide in the e-meeting would also advance the speaker notes and communicate with co-presenters. The system can aggregate devices being used by a user and provide a synchronized experience across all defined devices. This system is able to accommodate sharing between multiple devices for a single user or multiple identified users.

Referring now to FIG. 1, a computerized implementation 10 of an embodiment aggregating a set of defined electronic devices to provide a synchronized presentation experience across the devices will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system aggregating a set of defined electronic devices to provide a synchronized presentation experience across the devices. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code aggregating a set of defined electronic devices to provide a synchronized presentation experience across the devices, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
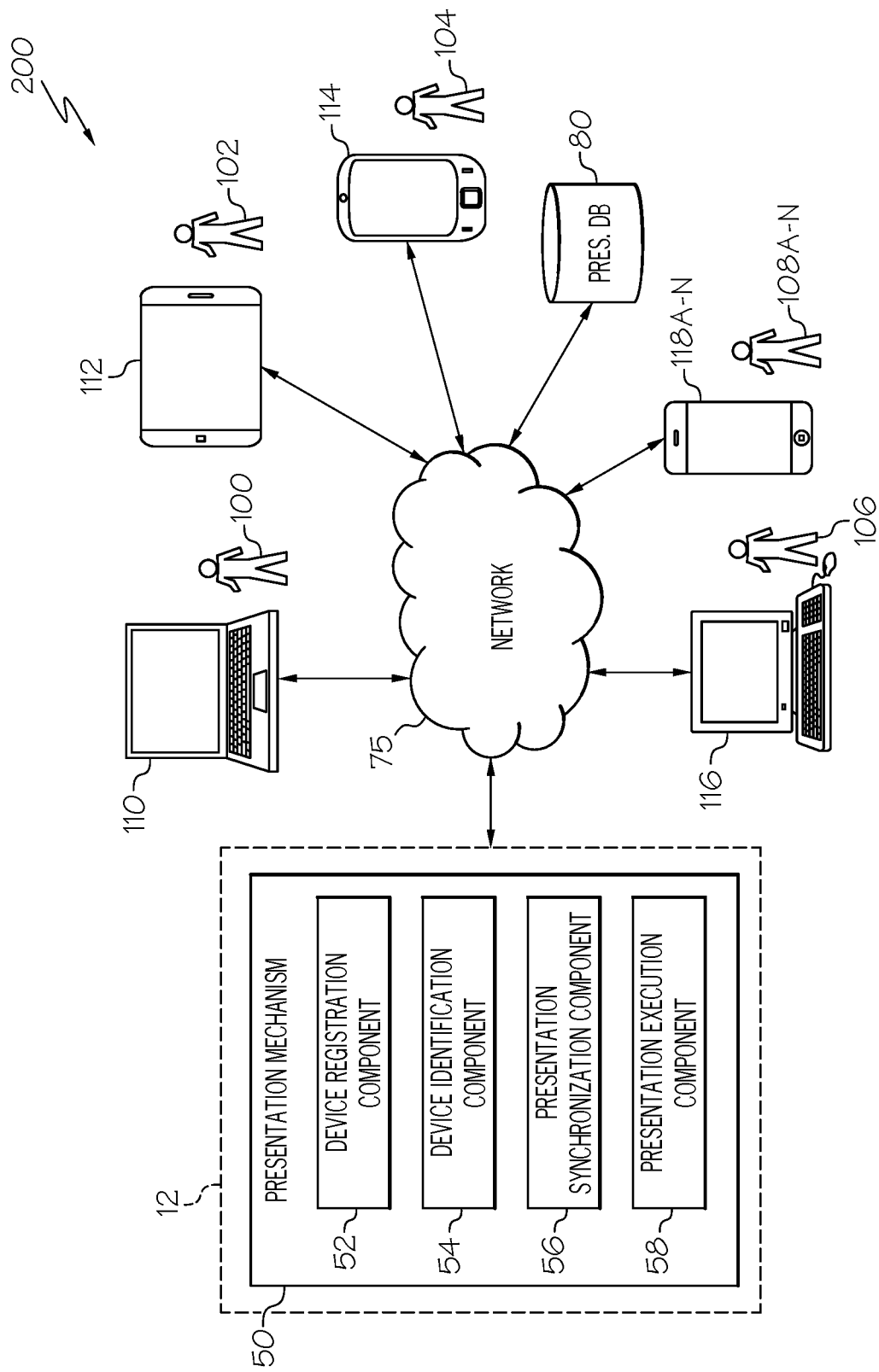
FIG. 2 shows a first schematic diagram 200 illustrating an exemplary environment for implementation according to an illustrative embodiment of the present invention.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a presentation mechanism 50 (hereinafter "system 50"). Rather, system 50 could be loaded on a server or server-capable device that communicates (e.g., wirelessly) with the physical server to transmit an alert to a mobile device of a user based on an inventory event of a product of interest to the user and a location of the user relative to one or more nearby retail locations.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, presentation mechanism 50 includes device registration component 52, device identification component 54, presentation synchronization component 56, and presentation execution component 58. The functions/acts of each component is described in detail below.

As shown, presentation mechanism 50 may be communicatively coupled with any number of electronic devices (e.g., laptop 110) via a network 75. The network 75 may be any type of network or any combination of networks. Specifically, the network 75 may include wired components, wireless components, or both wired and wireless components. Electronic devices may include a mobile smart phone, portable media player device, portable fitness device, mobile gaming device, laptop computer, tablet, personal computer, and/or the like. However, this list of exemplary devices is not exhaustive and is not intended to limit the scope of the present disclosure.

Further, presentation mechanism 50 may be communicatively coupled with presentation database (pres DB) 80. Presentation database 80 may include information related to a presentation session including one or more names of presenters, information related to one or more registered electronic devices, a title or subject of the presentation session, and/or the like. Presentation database 80 may include a relational database, which can be implemented in a combination of hardware (i.e., physical data storage hardware) and software (i.e., relational database software).

Device registration component 52 of system 50, as executed by computer system/server 12, is configured to register a host electronic device of a primary presenter for facilitating a presentation session. Registration of the host electronic device may be accomplished via an active or passive login process now known or later developed. For example, a login dialog box or user interface component may pop up on a display screen of the host electronic device in use by the primary presenter. The primary presenter may be required to enter his/her name, identifying information for the presentation session, a password for determining and/or authenticating the primary presenter's rights and privileges for facilitating a presentation session, and/or the like.

In an embodiment, device registration component 52 of system 50 may further be configured to register additional electronic devices of the primary presenter other than the host electronic device. For example, the primary presenter may register a laptop as the host electronic device, but may also register a mobile device such as a tablet which will be participating (e.g., presenting, viewing, etc.) in the presentation session.

Device registration component 52 of system 50 may further be configured to register each participating electronic device of any number of secondary presenters of the presentation session. A secondary presenter is a user who, though not the person initiating and/or facilitating the presentation session, may present content as part of the presentation session. Similarly, device registration component 52 may also be configured to register each participant electronic device of any number of non-presenting viewers. A non-presenting viewer will not present content but will simply view the presentation session on her respective device(s).

Device registration component 52 of system 50 may further be configured to identify one or more device capabilities of each registered electronic device. The one or more device capabilities can include, but is not limited to, a language supported by the electronic device, an application installed on the electronic device, an operating system installed on the electronic device, a hardware device installed on the electronic device, a video format supported by the electronic device, an audio format supported by the electronic device, an image format supported by the electronic device, a communications protocol supported by the electronic device, and/or a streaming data capability of the electronic device.

Device identification component 54 of system 50 may further be configured to assign a unique identifier to each registered electronic device and capture a function (or role) for each device in preparation for development of a presentation session. For example, a function may include, but is not limited to, a host presenting device, a secondary presenting device, or a non-presenting device. In an embodiment, a function for each registered electronic device associated with a presentation session may be specified prior to a commencement of the presentation session. For example, a primary presenter may specify an electronic device as a host presenting device when registering the device using a login dialog box or user interface component on a display screen of the device. For each remaining registered electronic device, the primary presenter or respective user of the device may specify a function for the device. In any case, a function is specified for each registered electronic device including the host electronic device as it relates to the presentation session.

Referring further to FIG. 2, assume Peter 100 acts as a primary presenter of a presentation session with MacBook laptop 110 registered as a host electronic device. Peter 100 will be facilitating the presentation session in a large conference room. Paul 102, Emily 104, and Mary 106 are secondary presenters having iOS tablet 112, Android smart phone 114, and Windows personal computer (pc) 116, respectively. Paul 102 and Emily 104 are also in the conference room with Peter 100, but Mary 106 is at a remote location. Non-presenters 108A-N represent those persons who will be viewing the presentation session (via devices 118A-N, respectively) from a remote location. Further assume a number of non-presenters (not shown) are located in the conference room to view the presentation session in person without the use of an electronic device.

FIG. 3 shows an example device medium identification table 300 for linking together the registered electronic devices of a presentation session. As shown, Peter 100 has a MacBook and will be presenting 10 slides using PowerPoint. Paul 102 will present an analytics demonstration using an ACME Studio application. Emily 104 will present an analytics dashboard using an ACME Browser application. Finally, Mary 108 will present the final 10 slides using PowerPoint. In an embodiment, information related to device medium identification table 300 may be stored in presentation database 80 for access by presentation mechanism 50.

Presentation synchronization component 56 of system 50, as executed by computer system/server 12, is configured to set up a synchronization configuration in terms of the primary and secondary presenting roles so a presenter can allow multiple device sharing in a single stream for presentation. In an embodiment, presentation synchronization component 56 may access information (e.g., information related to device medium identification table 300) stored in presentation database 80 to define the synchronization component. The synchronization configuration defines the flow of a presentation session, such as the different content portions to be presented and a transition between the portions to define a sequence. A content portion may include any type of application content a presenter wishes to display, such as one or more slides, document(s), photo(s), video(s), demonstration(s), dashboard(s), and/or the like. In an embodiment, a predefined baseline (or sequence) of how the content will be presented can be identified to bring the different application content into a single stream. In this example, the predefined baseline is discussed above and reflected in FIG. 3. In another embodiment, a presenter can utilize one or more markers to establish when one part of the presentation will transition to the next. For example, a marker at the end of the first 10 slides in the slide presentation can indicate that the analytics demonstration should execute after the $10^{th}$ slide, a marker at the end of the analytics demonstration can indicate the analytics dashboard should execute next, and so on. In an embodiment, a marker may be manually inserted by a presenter. In another embodiment, presentation synchronization component 56 may insert each marker between content.

In another embodiment, temporal markers may be used to transition between presentation content. For example, if it has been determined that the analytics dashboard portion of the presentation session lasts five minutes, then a temporal marker can indicate that the remaining 10 slides of the slide presentation should be presented after five minutes have elapsed for the analytics dashboard. In yet another embodiment, crowd-sourced markers may be used to transition between presentation content. For example, assume the presentation session has been presented multiple times and it has been shown that the analytics demonstration portion of the presentation session typically generates several questions from those viewing the presentation. Information gathered based on previously presented sessions may be used to determine when to transition from the analytics demonstration to the next part of the presentation session. In an embodiment, information related to makers may be stored in presentation database 80. In any case, presentation content from multiple devices are synchronized into a single stream for presentation.

Presentation execution component 58 of system 50, as executed by computer system/server 12, is configured to generate an aggregated and synchronized presentation stream for display on a display device by determining and controlling which electronic device executes which function/application based on a synchronization configuration. Referring back to FIG. 3, presentation execution component 58 begins executing the PowerPoint application on MacBook laptop 110. After the first 10 slides, presentation execution component 58 then transitions to the analytics demonstration on iOS tablet 112. Presentation execution component 58 may automatically transition to the analytics demonstration based on a synchronization configuration of the presentation session (e.g., markers indicating when/where to transition). In an embodiment, presentation execution component 58 may alert Paul 102 that his portion of the presentation is coming up (e.g., via a pop-up box or user interface component) so that Paul 102 can ready himself to discuss his portion of the presentation. In an embodiment, control of the presentation session may remain with the primary presenter. In another embodiment, control may switch from presenter to presenter as the content transitions. This process continues until the presentation session is complete.

Presentation execution component 58 of system 50 is further configured to ensure that a synchronization between functions/applications is maintained throughout a presentation session. For example, assume speaker notes have been added to the PowerPoint slides by Peter 100 and Mary 106. When a person is creating a slide deck, she can add speaker notes that she can refer to later while delivering the slide show to an audience. Then, during the presentation, the speaker notes are visible on a display of her device, but aren't visible to the audience. However, since all the presenters are linked together based on a registration of their electronic devices as a presenter, the speaker notes are made accessible to all presenters. Therefore, an advance in speaker notes (either forward or backward) on any presenter device will advance the slide deck in the presentation session. Likewise, an advance in the slides by any of the presenters will advance the speaker notes being displayed to the presenters.

Figure 4:
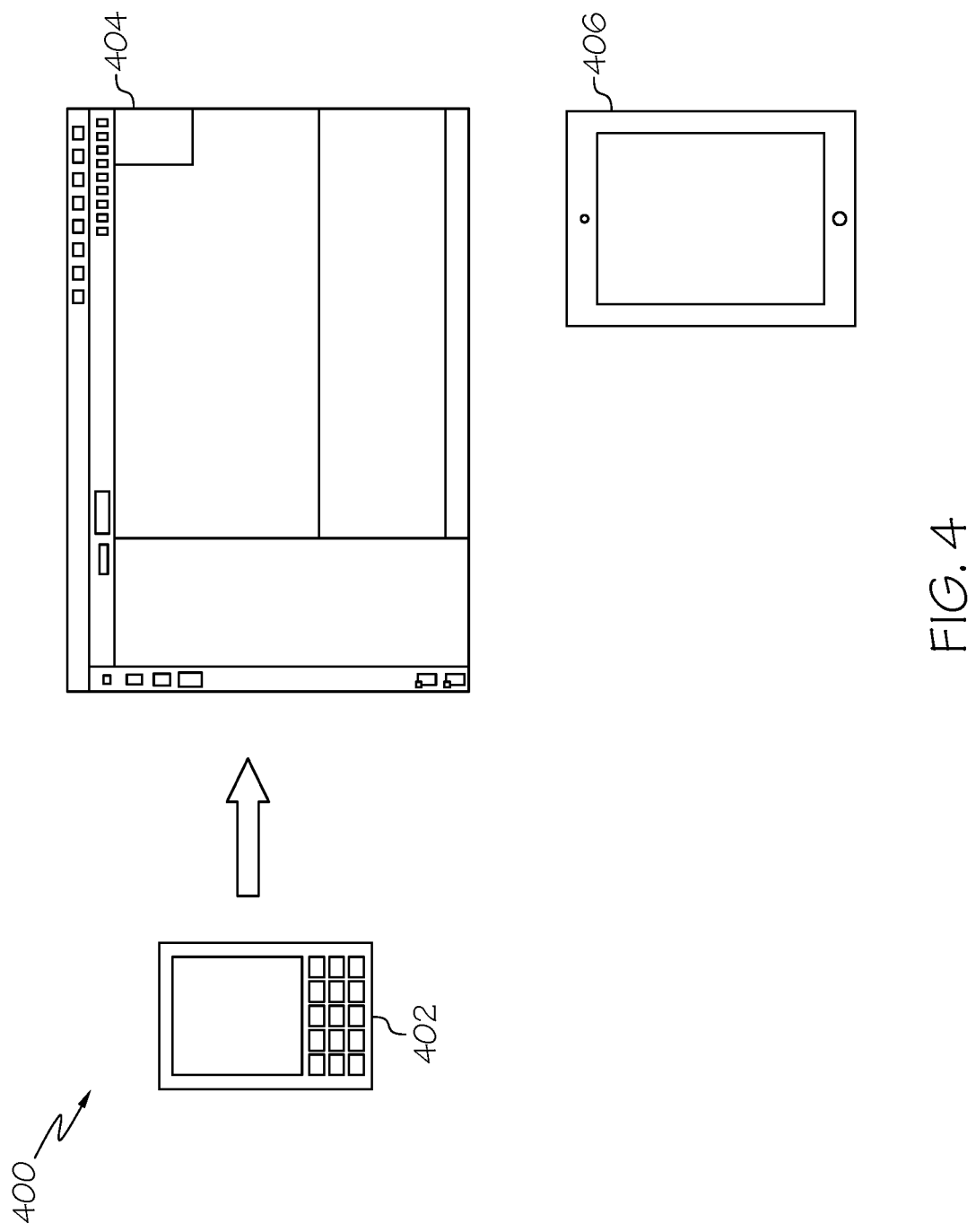
FIG. 4 shows an example device synchronization 400 according to an illustrative embodiment of the present invention.

FIG. 4 shows an example device synchronization as discussed above. When the speaker notes are advanced on electronic device 402, the slide deck is advanced on electronic device 404 of the presenter using the assigned identifier and presenting application of electronic device 404. Electronic device 406 is associated with a non-presenter who is viewing the presentation session and witnesses the slide deck advance at the moment the speaker notes are advanced on electronic device 402. Another example may include synchronizing closed-captioning and/or subtitling with different scenes of a video stream being presented. The examples above are illustrative only and not intended to be limiting. Other types of application synchronization may be implemented within the spirit and scope of this disclosure.

Presentation execution component 58 of system 50 may further be configured to allow presenters to communicate digitally via notes, texts, and/or comments in private dynamically during a presentation session via a collaborative user interface (UI) (e.g., a small chat box) only visible to the presenters. Some presenters may be physically present in a same conference room, while another presenter may have to conference in via video sharing or the like. Presentation execution component 58 can ensure only presenters have access to the private communications since each presenter has registered her respective electronic device as a presenting device. Non-presenters will only be able to view the synchronized presentation stream and not have visibility to the collaborative UI.

Further, presentation execution component 58 of system 50 may further be configured to act as a stream/channel arbitrator which may facilitate a backup presentation method when there are constraints with network quality of experience (QOE). For example, assume a presenter wants to present via a multimedia rich display, then presentation execution component 58 can opt to "failover" or adjust the presentation stream to a pure text driven presentation due to a constraint issue, such as low bandwidth, high latency, packet loss scenarios, identified device capability, and/or the like. If the issue exists only for certain viewers (e.g., those viewing remotely), then the text driven presentation may be displayed only to those viewers while those without the constraint may still enjoy the multimedia rich presentation. If the issue exists for all viewers, then the text driven presentation may be pushed from the presenter to all viewers.

In addition, presentation execution component 58 of system 50 may further be configured to monitor electronic device availability among those devices having registered for a presentation session. For example, in mobile systems, battery levels can be surfaced within a collaborative user interface (UI) to ensure device availability during presentation. Similarly, for desktop systems operating system (OS) update schedules can be surfaced within the collaborative UI, to device availability during the presentation session. The examples above are illustrative only and not intended to be limiting. Information related to other situations and/or potential situations which may make an electronic device unavailable may be surfaced so that a user may be notified that his device may become unavailable unless steps are taken (e.g., plugging a mobile device having a low battery into a power source). This is especially true for the electronic devices presenting content as part of a presentation session. If a presenting device becomes unavailable, the presentation session will be disrupted.

Figure 5:
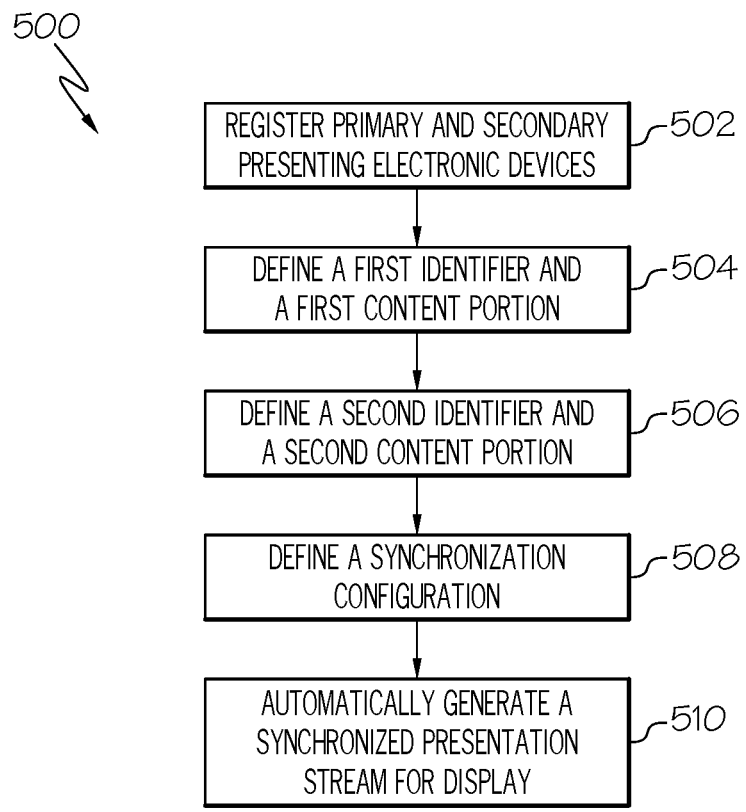
FIG. 5 shows a process flowchart 500 for aggregating a set of defined electronic devices to provide a synchronized presentation experience across the devices according to an illustrative embodiment of the present invention.

FIG. 5 shows an example flow diagram for generating a presentation session. At 502, device registration component 52 of system 50 registers primary and secondary presenting electronic devices. At 504 and 506, device identification component 54 of system 50 defines a first identifier and a first content portion related to the primary electronic device and a second identifier and a second content portion related to the secondary electronic device. At 508, presentation synchronization component 56 of system 50 defines, using the first and second identifiers and the first and second content portions, a synchronization configuration to identify a flow for the presentation session. At 510, presentation execution component 58 of system 50 automatically generates, by aggregating the primary and secondary presenting electronic devices based on the synchronization configuration, a synchronized presentation stream for display.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process aggregating a set of defined electronic devices to provide a synchronized presentation experience across the devices. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process aggregating a set of defined electronic devices to provide a synchronized presentation experience across the devices. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches aggregating a set of defined electronic devices to provide a synchronized presentation experience across the devices. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for generating a synchronized presentation session, the method comprising:
registering a primary presenting electronic device of a primary presenter and a secondary presenting electronic device of a second presenter;
defining a first identifier and a first content portion of presentation data stored on the primary presenting electronic device, the first identifier capturing a role of the primary presenting electronic device as having a function of host-presenting device;
defining a second identifier and a second content portion of presentation data stored on the secondary presenting electronic device, the second identifier capturing a role of the secondary presenting electronic device as having a function of secondary presenting device;
defining, using the first and second identifiers and the first and second content portions, a synchronization configuration that identifies a flow for the presentation session using a marker associated with a part of the synchronized presentation that establishes when the part of the synchronized presentation session will transition to a next part of the synchronized presentation session and specifies a location of the next part of the synchronized presentation session; and
automatically generating, by aggregating the first and content portions of presentation data on the primary and secondary presenting electronic devices based on the synchronization configuration, a synchronized presentation stream for display according to a predetermined order of the primary presenter and the secondary presenter defined based on the first and second identifiers.

2. The method of claim 1, wherein the marker is automatically inserted on the primary presenting electronic device of the primary presenter, wherein the marker has a temporal component, and wherein the temporal component is automatically adjusted for a subsequent presentation session in response to crowd-sourced information gathered based on previously presented presentation sessions.

3. The method of claim 1, further comprising presenting a user interface to allow a private collaboration between the primary and secondary presenting electronic devices.

4. The method of claim 3, further comprising registering a first non-presenting device and a second non-presenting device and providing access of the synchronized presentation stream to the first non-presenting and the second non-presenting device device while not providing access to the private collaboration.

5. The method of claim 4, further comprising:
identifying a constraint associated with the first non-presenting device but not with the second non-presenting device;
and adjusting the synchronized presentation stream to the first non-presenting device based on the constraint while leaving the synchronized presentation stream to the second non-presenting device unaltered.

6. The method of claim 1, further comprising registering a second secondary electronic device, wherein the first content portion is a slide deck and the second secondary electronic device includes a set of speaker notes associated with the slide deck, wherein an advance in the slide deck advances the speaker notes, and wherein an advance in the speaker notes advances the slide deck.

7. The method of claim 1, further comprising monitoring a device availability of the first and second electronic devices.

8. A computer program product embodied in a computer readable medium that, when executed by a computer device, performs a method for generating a synchronized presentation session, the method comprising:
registering a primary presenting electronic device and a secondary presenting electronic device;
defining a first identifier and a first content portion of presentation data stored on the primary presenting electronic device, the first identifier capturing a role of the primary presenting electronic device as having a function of host-presenting device;
defining a second identifier and a second content portion of presentation data stored on the secondary presenting electronic device, the second identifier capturing a role of the secondary presenting electronic device as having a function of secondary presenting device;
defining, using the first and second identifiers and the first and second content portions, a synchronization configuration that identifies a flow for the presentation session using a marker associated with a part of the synchronized presentation that establishes when the part of the synchronized presentation session will transition to a next part of the synchronized presentation session and specifies a location of the next part of the synchronized presentation session; and
automatically generating, by aggregating the first and content portions of presentation data on the primary and secondary presenting electronic devices based on the synchronization configuration, a synchronized presentation stream for display according to a predetermined order of the primary presenter and the secondary presenter defined based on the first and second identifiers.

9. The computer program product of claim 8, wherein the marker is automatically inserted on the primary presenting electronic device of the primary presenter, wherein the marker has a temporal component, and wherein the temporal component is automatically adjusted for a subsequent presentation session in response to crowd-sourced information gathered based on previously presented presentation sessions.

10. The computer program product of claim 8, the method further comprising presenting a user interface to allow a private collaboration between the primary and secondary presenting electronic devices.

11. The computer program product of claim 10, the method further comprising registering a first non-presenting device and a second non-presenting device and providing access of the synchronized presentation stream to the first non-presenting and the second non-presenting device device while not providing access to the private collaboration.

12. The computer program product of claim 11, the method further comprising:
identifying a constraint associated with the first non-presenting device but not with the second non-presenting device;
and adjusting the synchronized presentation stream to the first non-presenting device based on the constraint while leaving the synchronized presentation stream to the second non-presenting device unaltered.

13. The computer program product of claim 8, the method further comprising registering a second secondary electronic device, wherein the first content portion is a slide deck and the second secondary electronic device includes a set of speaker notes associated with the slide deck, wherein an advance in the slide deck advances the speaker notes, and wherein an advance in the speaker notes advances the slide deck.

14. The computer program product of claim 8, the method further comprising monitoring a device availability of the first and second electronic devices.

15. A system for generating a synchronized presentation session, comprising:
   a memory medium comprising instructions;
   a bus coupled to the memory medium; and
   a processor coupled to the bus that when executing the instructions causes the system to perform a method, comprising:
      registering a primary presenting electronic device and a secondary presenting electronic device;
      defining a first identifier and a first content portion of presentation data stored on the primary presenting electronic device, the first identifier capturing a role of the primary presenting electronic device as having a function of host-presenting device;
      defining a second identifier and a second content portion of presentation data stored on the secondary presenting electronic device, the second identifier capturing a role of the secondary presenting electronic device as having a function of secondary presenting device;
      defining, using the first and second identifiers and the first and second content portions, a synchronization configuration that identifies a flow for the presentation session using a marker associated with a part of the synchronized presentation that establishes when the part of the synchronized presentation session will transition to a next part of the synchronized presentation session and specifies a location of the next part of the synchronized presentation session; and
      automatically generating, by aggregating the first and content portions of presentation data on the primary and secondary presenting electronic devices based on the synchronization configuration, a synchronized presentation stream for display according to a predetermined order of the primary presenter and the secondary presenter defined based on the first and second identifiers.

16. The system of claim 15, wherein the marker is automatically inserted on the primary presenting electronic device of the primary presenter, wherein the marker has a temporal component, and wherein the temporal component is automatically adjusted for a subsequent presentation session in response to crowd-sourced information gathered based on previously presented presentation sessions.

17. The system of claim 15, the method further comprising presenting a user interface to allow a private collaboration between the primary and secondary presenting electronic devices.

18. The system of claim 17, the method further comprising registering a first non-presenting device and a second non-presenting device and providing access of the synchronized presentation stream to the first non-presenting and the second non-presenting device device while not providing access to the private collaboration.

19. The system of claim 18, the method further comprising:
   identifying a constraint associated with the first non-presenting device but not with the second non-presenting device;
   and adjusting the synchronized presentation stream to the first non-presenting device based on the constraint while leaving the synchronized presentation stream to the second non-presenting device unaltered.

20. The system of claim 15, the method further comprising registering a second secondary electronic device, wherein the first content portion is a slide deck and the second secondary electronic device includes a set of speaker notes associated with the slide deck, wherein an advance in the slide deck advances the speaker notes, and wherein an advance in the speaker notes advances the slide deck.

* * * * *